United States Patent
Suganuma et al.

(10) Patent No.: US 10,099,291 B2
(45) Date of Patent: Oct. 16, 2018

(54) METHOD FOR PRODUCING METAL NANOWIRES AND SILVER NANOWIRES

(71) Applicants: SHOWA DENKO K.K., Minato-ku, Tokyo (JP); OSAKA UNIVERSITY, Suita-shi, Osaka (JP)

(72) Inventors: Katsuaki Suganuma, Suita (JP); Jinting Jiu, Suita (JP); Masaya Nogi, Suita (JP); Tohru Sugahara, Suita (JP); Teppei Araki, Suita (JP); Hiroshi Uchida, Tokyo (JP); Hideki Ohata, Tokyo (JP); Masanao Hara, Tokyo (JP); Eri Okazaki, Tokyo (JP)

(73) Assignees: SHOWA DENKO K.K., Minato-ku, Tokyo (JP); OSAKA UNIVERSITY, Suita-shi, Osaka (JP)

( * ) Notice: Subject to any disclaimer, the term of this patent is extended or adjusted under 35 U.S.C. 154(b) by 302 days.

(21) Appl. No.: 14/893,329

(22) PCT Filed: May 26, 2014

(86) PCT No.: PCT/JP2014/063851
§ 371 (c)(1),
(2) Date: Nov. 23, 2015

(87) PCT Pub. No.: WO2014/189149
PCT Pub. Date: Nov. 27, 2014

(65) Prior Publication Data
US 2016/0121403 A1    May 5, 2016

(30) Foreign Application Priority Data

May 24, 2013    (JP) ................. 2013-110243

(51) Int. Cl.
| | |
|---|---|
| B22F 9/24 | (2006.01) |
| B22F 1/00 | (2006.01) |
| B82Y 30/00 | (2011.01) |
| B82Y 40/00 | (2011.01) |

(52) U.S. Cl.
CPC ............... *B22F 9/24* (2013.01); *B22F 1/004* (2013.01); *B22F 1/0025* (2013.01); *B22F 1/0044* (2013.01); *B22F 2009/245* (2013.01); *B22F 2301/255* (2013.01); *B22F 2304/05* (2013.01); *B82Y 30/00* (2013.01); *B82Y 40/00* (2013.01)

(58) Field of Classification Search
CPC .......... B22F 9/24; B22F 1/0025; B22F 1/004; B22F 1/0044; B82Y 30/00; B82Y 40/00
USPC ........................................................... 75/370
See application file for complete search history.

(56) References Cited

U.S. PATENT DOCUMENTS

| | | | |
|---|---|---|---|
| 2009/0311530 | A1 | 12/2009 | Hirai et al. |
| 2012/0247275 | A1 | 10/2012 | Yang et al. |
| 2013/0160608 | A1 | 6/2013 | Nusko et al. |

FOREIGN PATENT DOCUMENTS

| | | | |
|---|---|---|---|
| CN | 102728848 A | 10/2012 | |
| CN | 103042225 A | 4/2013 | |
| CN | 103084584 A | 5/2013 | |
| CN | 103100724 A | 5/2013 | |
| JP | 2008-202125 A | 9/2008 | |
| JP | 2009-155674 A | 7/2009 | |
| JP | 2009-221563 A | 10/2009 | |
| JP | 2009-299162 A | 12/2009 | |
| WO | 2012/022332 A2 | 2/2012 | |

OTHER PUBLICATIONS

First Office action dated Jul. 22, 2016, from the State Intellectual Property Office of the P.R.C., in counterpart Chinese application No. 201480029788.7.
Notification of Reasons for Refusal dated May 30, 2017 from the Korean Intellectual Property Office in counterpart application No. 10-2015-7032184.
Mao et al. "One-Dimensional Silver Nanowires Synthesized by Self-Seeding Polyol Process" Journal of Nanoparticle Research, vol. 14. No. 887, Jun. 2012, pp. 1-15. (16 pages total).
Wiley et al. "Polyol Synthesis of Silver Nanostructures: Control of Product Morphology with Fe(II) or Fe(III) Species", Langmuir: the ACS Journal of Surfaces and Colloids, vol. 21, No. 18, Aug. 30, 2005, pp. 8077-8080. (4 pages total).
International Search Report for PCT/JP2014/063851 dated Aug. 26, 2014.
Notification of Reasons for Refusal dated Jun. 12, 2018, from the Japanese Patent Office in counterpart application No. 2015-518308.

*Primary Examiner* — Edward M Johnson
(74) *Attorney, Agent, or Firm* — Sughrue Mion, PLLC

(57) ABSTRACT

Provided are a metal nanowire production method capable of producing long and thin metal nanowires, and metal nanowires produced thereby. A metal nanowire production method comprising, a step for preparing a solution containing a metal salt, a polymer, at least one selected from a group consisting of halides, sulfides, carbonates, and sulfates, and an aliphatic alcohol, and a step for heating and reacting the solution at the temperature of 100° C. to 250° C. for 10 minutes or more while maintaining a practical shear stress applied to the solution at 10 mPa·m or less, wherein, during the heating and reacting step, ultraviolet-visible absorption spectrum change of the solution is measured, and a reaction time is controlled on the basis of the ultraviolet-visible absorption spectrum information.

15 Claims, 5 Drawing Sheets

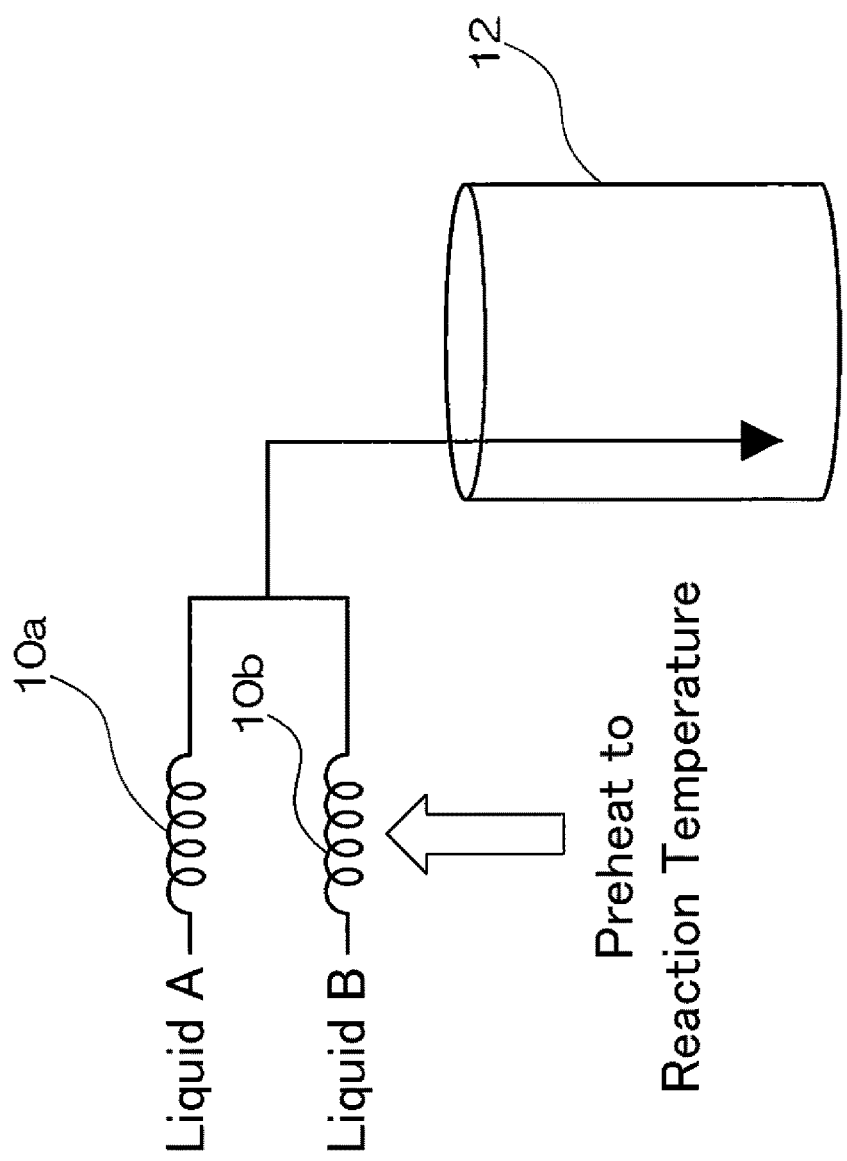
[FIG. 1]

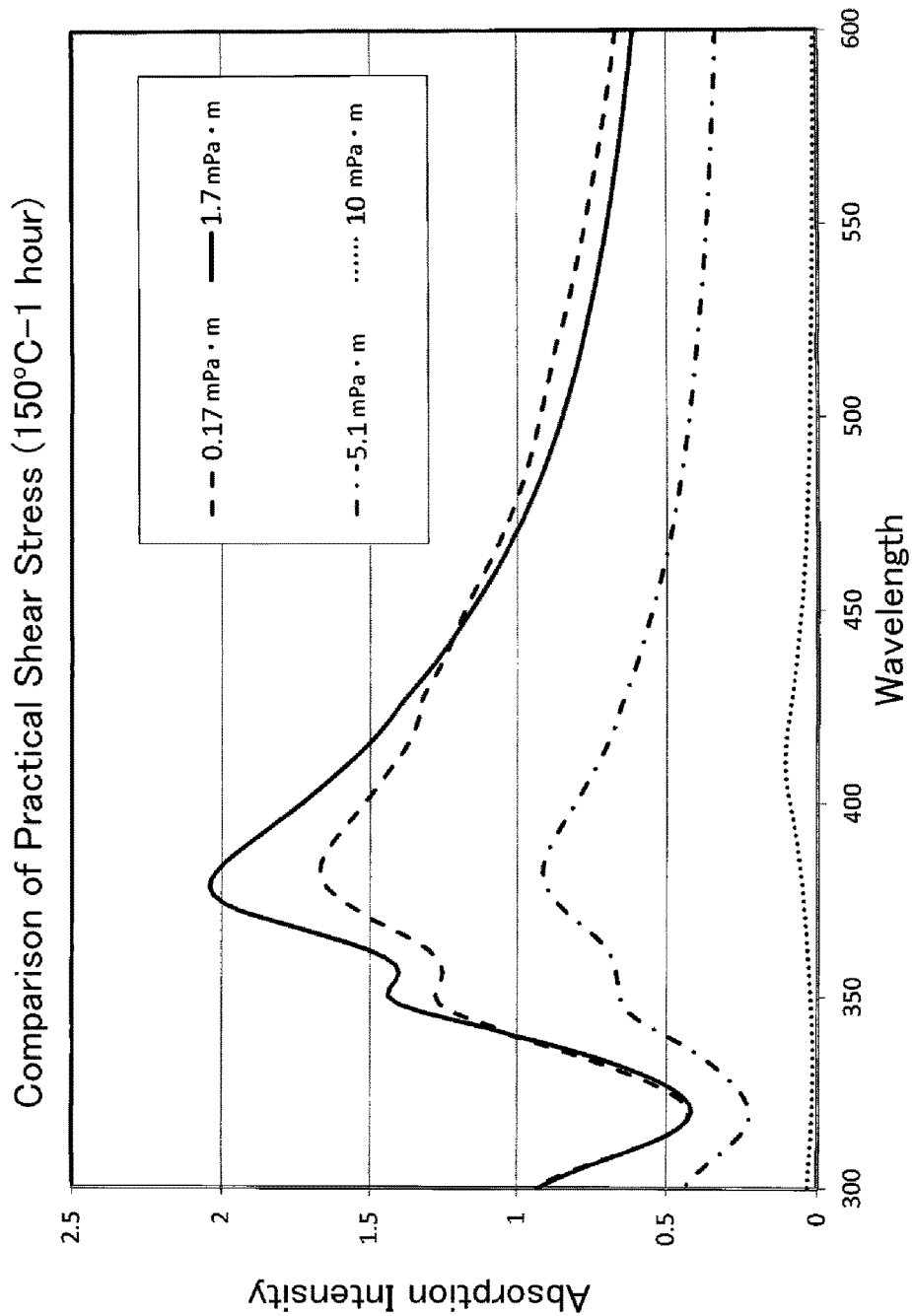
[FIG. 2]

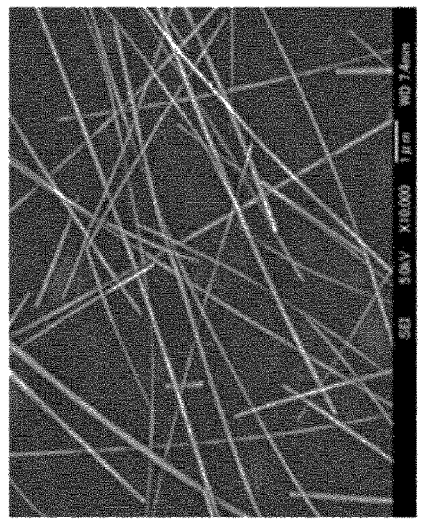
FIG. 3 (a) 0.17 mPa·m
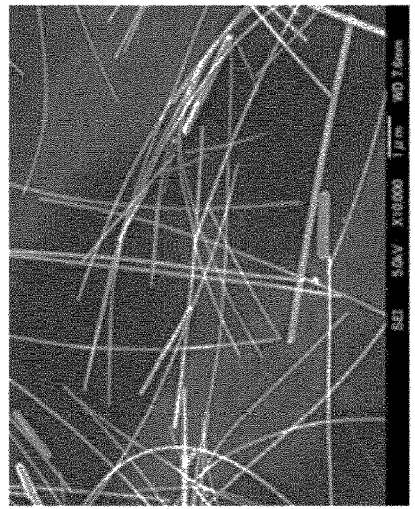
FIG. 3 (b) 1.7 mPa·m
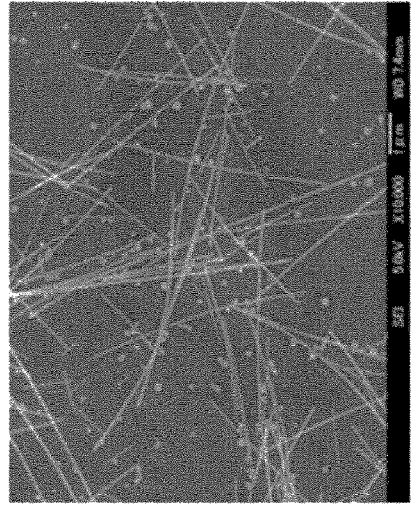
FIG. 3 (c) 5.1 mPa·m
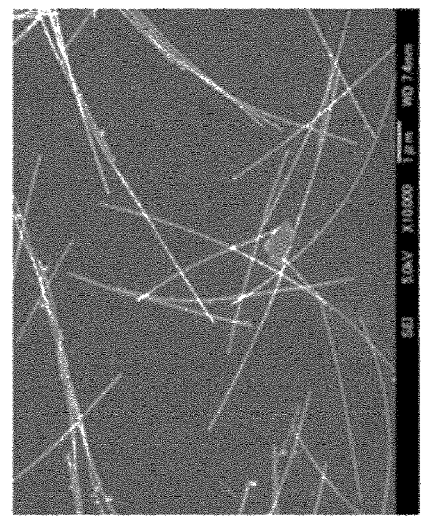
FIG. 3 (d) 10.2 mPa·m

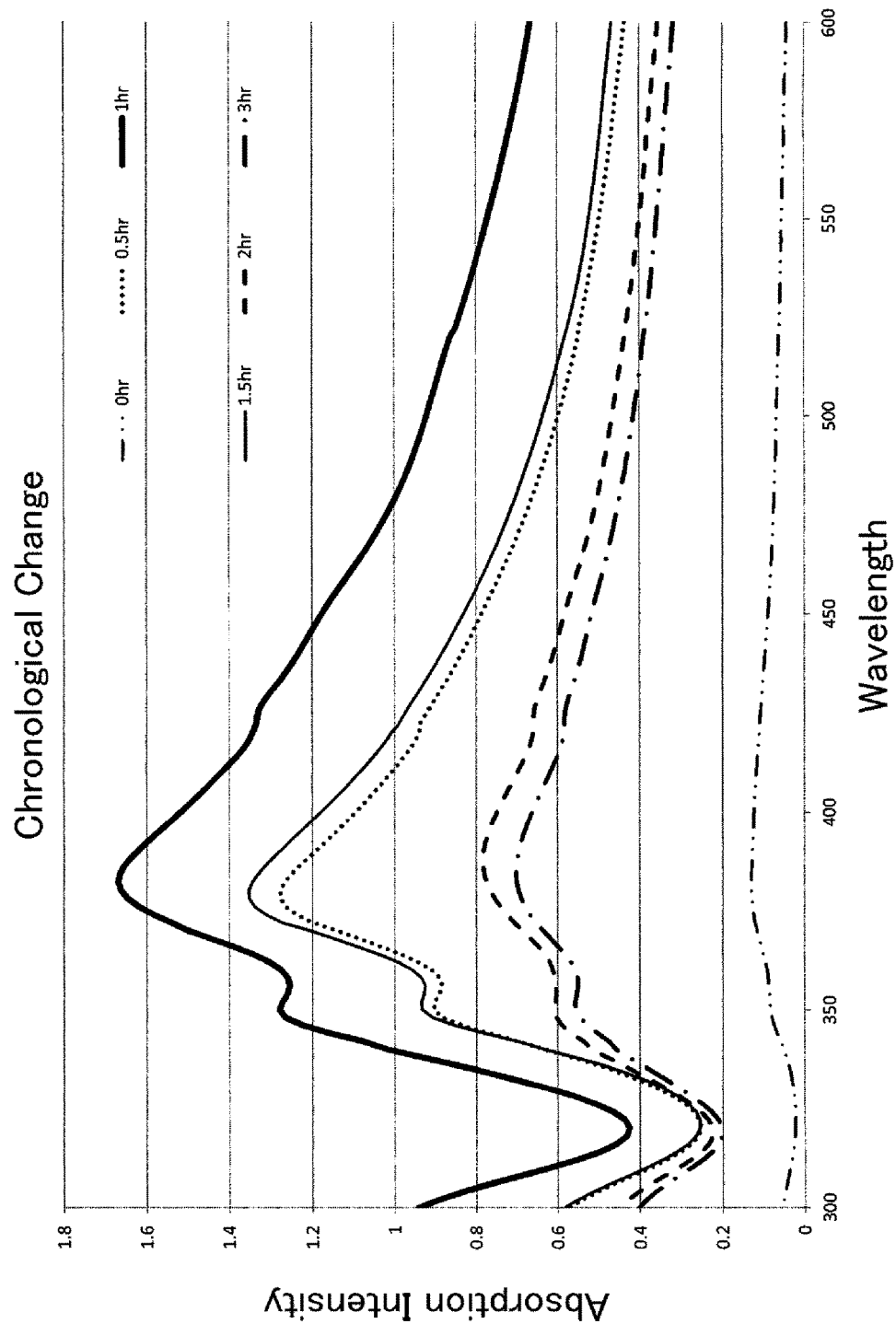
[FIG. 4]

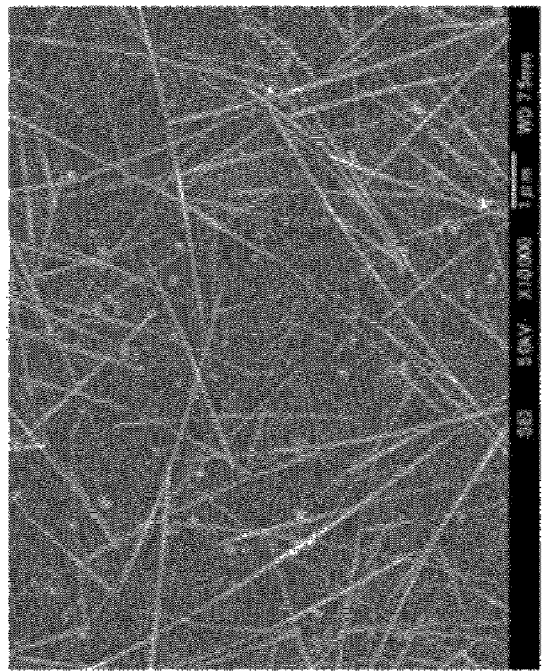
FIG. 5 (b) After 3 hrs
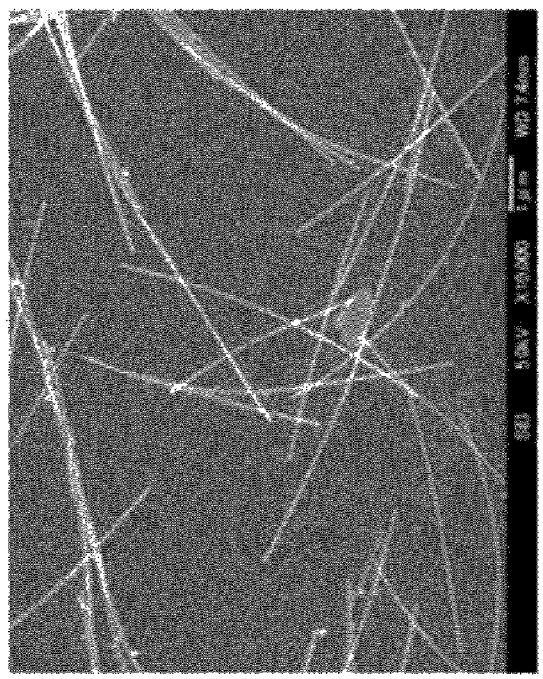
FIG. 5 (a) After 1.5 hrs

METHOD FOR PRODUCING METAL NANOWIRES AND SILVER NANOWIRES

CROSS REFERENCE TO RELATED APPLICATIONS

This application is a National Stage of International Application No. PCT/JP2014/063851 filed May 26, 2014, claiming priority based on Japanese Patent Application No. 2013-110243 filed May 24, 2013, the contents of all of which are incorporated herein by reference in their entirety.

TECHNICAL FIELD

The present disclosure relates to a method for producing metal nanowires, metal nanowires produced by the method, a method for producing silver nanowires, and silver nanowires produced by the method.

BACKGROUND ART

A metal nanowire is a conductive material made of a metal having a diameter in the order of nanometer, and having a wire (linear) shape. A conductive layer (thin film) formed by metal nanowires has a high conductivity and a high light transmittance, and thus, such a conductive layer is used for a transparent electrode material, etc., of, for example, a touch panel.

As a method for producing metal nanowires, for example, the following Patent Document 1 discloses a technology of mixing a metal salt, polyvinylpyrrolidone, a chloride or nitrate, and one selected from a group consisting of ethylene glycol and propylene glycol.

PRIOR ART

Patent Document

Patent Document 1: Japanese Unexamined Patent Publication (Kokai) No. 2009-155674

SUMMARY

However, in the prior arts, there are no suggestions regarding the problem that, due to the effect of the shear stress to the reaction liquid at the time of producing metal nanowires, the metal nanowires may be bent or broken, resulting in the difficulty in producing long and thin metal nanowires. Further, even if the reaction is performed at a lower shear stress, there is still a problem that when the reaction time is extended, the number of particle-like impurities increases.

With respect to a metal nanowire, the smaller the diameter, the higher the light transmittance of a transparent electrode, etc., formed thereby, and the longer the length, the smaller the amount of metal nanowires required for obtaining a sufficient conductivity. As the amount of nanowires used is reduced, the cost for the transparent electrode can be reduced, and the light transmittance can be increased. Therefore, producing a long and thin metal nanowire is an important problem to be solved.

One of the objectives of the present disclosure is to provide a metal nanowire production method capable of producing long and thin metal nanowires, metal nanowires produced by the method, a silver nanowire production method, and silver nanowires produced by the method.

In order to attain the above objectives, one aspect of the present disclosure is a metal nanowire production method comprising, a step for preparing a solution containing a metal salt, a polymer, at least one selected from a group consisting of halides, sulfides, carbonates, and sulfates, and an aliphatic alcohol, and a step for heating and reacting the solution at the temperature of 100° C. to 250° C. for 10 minutes or more while maintaining a practical shear stress applied to the solution at 10 mPa·m or less, wherein, during the heating and reacting step, ultraviolet-visible absorption spectrum change of the solution is measured, and a reaction time is controlled on the basis of the ultraviolet-visible absorption spectrum information.

The metal for producing the metal nanowires is preferably at one selected from a group consisting of gold, silver, copper, platinum, palladium, ruthenium, cobalt, nickel, molybdenum, indium, iridium, and titanium, and a metal salt of such a metal is used. As for the salt, a nitrate, an organic carboxylate, a metal alkoxide, and a metal phenoxide, having a high solubility to the aliphatic alcohol used, is preferable.

The polymer is at least one selected from a group consisting of polyvinylpyrrolidone, poly-N-vinyl acetamide, poly-N-vinyl formamide, polyvinyl caprolactam, and polyacrylamide. In particular, polyvinylpyrrolidone is preferable.

Preferably, the halide is selected from a group consisting of NaCl, $CoCl_2$, $SnCl_4$, $CuCl_2$, $NiCl_2$, $FeCl_3$, $ZnCl_2$, NaBr, NaI, KBr, KI, and quaternary ammonium salts represented by $R_4NCl$, $R_4NBr$, $R_4NI$ (wherein, R is an alkyl group having 1 to 12 carbons), the sulfide is selected from a group consisting of $Na_2S$ and $K_2S$, the carbonate is selected from a group consisting of $Na_2CO_3$ and $K_2CO_3$, and the sulfate is selected from a group consisting of $Na_2SO_4$ and $K_2SO_4$. The quaternary ammonium salt is preferably the one in which R is a normal alkyl group, from the viewpoint of easy availability.

The aliphatic alcohol is preferably the one in which the metal salt and the at least one selected from a group consisting of halides, sulfides, carbonates, and sulfates added to the solution, can be dissolved, and which has a boiling point of 100° C. or more and a low viscosity for the purpose of lowering a shear stress. Preferably, the viscosity of the aliphatic alcohol itself is 10 Pa·s or less at 25° C.

When the metal is silver, and the aliphatic alcohol is at least one selected from a group consisting of ethylene glycol and propylene glycol, the at least one selected from a group consisting of halides, sulfides, carbonates, and sulfates preferably has a concentration of $1\times10^{-8}$ M to $1\times10^{-2}$ M. Under these conditions, ultraviolet-visible absorption spectrum of the solution is measured during the heating step, and the reaction is preferably stopped at a point where a ratio (A420 nm/A350 nm) representing an absorption intensity at 420 nm (A420) relative to an absorption intensity at 350 nm (A350) is 2 or less, and an absorption intensity at 380 nm (A380) is more than a half of the peak absorption intensity at 380 nm Another aspect of the present disclosure is a metal nanowire produced by the above metal nanowire production method. Preferably, the metal nanowire is a silver nanowire.

According to the present disclosure, long and thin metal nanowires can be produced.

BRIEF DESCRIPTION OF DRAWINGS

FIG. 1 is a schematic explanatory view of a device suitable for producing metal nanowires according to the present disclosure.

FIG. 2 shows ultraviolet-visible absorption spectra of reaction liquids reacted at 150° C. for 1 hour, while different shear stresses are applied to the reaction liquids at the time of production.

FIGS. 3(a), 3(b), 3(c), and 3(d) show scanning electron microscope (SEM) images of silver nanowires obtained by reacting and heating reaction liquids at 150° C. for 1 hour, while different shear stresses are applied to the reaction liquids at the time of production.

FIG. 4 is a view showing chronological change of the ultraviolet-visible absorption spectrum of a reaction liquid heated and reacted at 150° C., while a practical shear stress of 1.7 mPa·m is applied to the reaction liquid at the time of production.

FIGS. 5(a) and 5(b) show scanning electron microscope (SEM) images of silver nanowires obtained by reacting and heating a reaction liquid at 150° C. for 1.5 hours and 3 hours, while the practical shear stress of 1.7 mPa·m is applied to the reaction liquid at the time of production.

ASPECT OF DISCLOSURE

Hereinbelow, an aspect of the present disclosure (hereinbelow, referred to as an aspect) will be explained.

One of the characteristics of a metal nanowire production method according to an aspect of the present disclosure is that the method comprises a step of preparing a solution which contains a metal salt, a polymer, at least one selected from a group consisting of halides, sulfides, carbonates, and sulfates, and an aliphatic alcohol, and a step of heating and reacting the solution at a temperature of 100° C. to 250° C. for 10 minutes or more, while a practical shear stress of 10 mPa·m or less is applied to the solution. The practical shear stress will be explained later below.

The above step for preparing a solution may be performed by, for example, mixing a first solution containing a polymer and a metal salt, with a second solution containing at least one selected from a group consisting of halides, sulfides, carbonates, and sulfates. In this case, an aliphatic alcohol is contained as a solvent for the first solution and a solvent for the second solution. As another example, a solution may be prepared by mixing the metal salt, the polymer, at least one selected from a group consisting of halides, sulfides, carbonates, and sulfates, and the aliphatic alcohol. As far as a uniform solution can be finally prepared, there is no limitation regarding the order of mixing.

The polymer should be dissolved in the aliphatic alcohol used. Specifically, the polymer is at least one selected from a group consisting of polyvinylpyrrolidone, poly-N-vinyl acetamide, poly-N-vinyl formamide, polyvinyl caprolactam, and polyacrylamide. Among them, polyvinylpyrrolidone is particularly preferable. Such a polymer contributes to the growth of a wire. If the polymer is not present, growth into a wire shape hardly occurs, and most part of the solution becomes irregular-shaped agglomerated powder.

The aliphatic alcohol functions as a reducing agent of the metal salt. The hydroxyl group of the aliphatic alcohol is used for reducing the metal salt. Further, the metal salt, halide, sulfide, carbonate, and sulfate, which are used as a raw materials, should be dissolved in the aliphatic alcohol. The boiling point, at one atmospheric pressure, of the aliphatic alcohol is preferably higher (100° C. or higher) than the below-mentioned reaction (reduction) temperature. Further, the viscosity of the aliphatic alcohol is preferably low, in order to lower the shear stress. The viscosity of the aliphatic alcohol itself is preferably 10 Pa·s or less at 25° C., more preferably 1.5 Pa·s or less, still more preferably 200 mPa·s or less, and particularly preferably 50 mPa·s or less.

Preferably, specific examples of the aliphatic alcohol may be at least one selected from a group consisting of n-octanol, 2-ethylhexyl alcohol, ethylene glycol, 1,2-propylene glycol, 1,3-propylene glycol, diethylene glycol, triethylene glycol, dipropylene glycol, 1,3-butanediol, 1,4-butanediol, 2-methyl-1,3-propanediol, and glycerin, and among them, ethylene glycol and propylene glycol are particularly preferable.

In the above step, the practical shear stress applied to the solution (reaction liquid) obtained by mixing the first solution and the second solution, or the solution (reaction liquid) obtained by mixing the metal salt, the polymer, at least one selected from a group consisting of halides, sulfides, carbonates, and sulfates, and the aliphatic alcohol, is made to be preferably 10 mPa·m or less, more preferably 5 mPa·m or less, still more preferably 2 mPa·m or less, and the heating and reacting is performed at a temperature of 100° C. to 250° C. for 10 minutes or more. When the temperature is less than 100° C., if the aliphatic alcohol is used as a reducing agent, the reaction speed is slow, resulting in unfavorable low productivity. Since the shear stress applied to the metal nanowire to be generated can be suppressed as above, long and thin metal nanowires can be produced.

From the viewpoints of resistance value and transmittance, the metal constituting the metal salt is preferably at least one selected from a group consisting of gold, silver, copper, platinum, palladium, ruthenium, cobalt, nickel, molybdenum, indium, iridium, and titanium. When the resistance value is particularly taken into account, gold, silver, or copper is more preferable.

The halide, sulfide, carbonate, and sulfate may be selected from halides, sulfides, carbonates, and sulfates of a metal having a greater ionization tendency than the metal to be produced. Examples of the halide may be NaCl, $CoCl_2$, $SnCl_4$, $CuCl_2$, $NiCl_2$, $FeCl_3$, $ZnCl_2$, NaBr, NaI, KBr, KI, and a quaternary ammonium salt represented by $R_4NCl$, $R_4NBr$, $R_4NI$ (wherein R is an alkyl group having 1 to 12 carbons); the sulfide may be $Na_2S$, $K_2S$; the carbonate may be $Na_2CO_3$, $K_2CO_3$; and the sulfate may be $Na_2SO_4$, $K_2SO_4$. The halide, sulfide, carbonate, and sulfate of a metal having a greater ionization tendency than the metal to be produced contributes to the deposition of wire-shaped metal and growth of wire when the metal salt is reduced. If almost no such halide, sulfide, carbonate, and sulfate is present, growth into a wire shape hardly occurs, and most part of the solution becomes irregular-shaped agglomerated powder.

When the solvent is at least one selected from a group of aliphatic alcohols, the concentration of the polymer, after the first solution and the second solution are mixed, is preferably 0.001 to 0.5 M, more preferably 0.005 to 0.3 M, and still more preferably 0.01 to 0.1 M. When the concentration is too low, nanowires cannot be generated. When the concentration is too high, too much polymer remains in the nanowire, resulting in preventing the decrease in resistance. In the present specification, the concentration M (mol/L) of the polymer is a value converted to a monomer unit.

When the solvent is at least one selected from a group of aliphatic alcohols, the concentration of the metal salt, after the first solution and the second solution are mixed, is preferably 0.0001 to 0.5 M (M is mol/L), more preferably 0.0005 to 0.1 M, and still more preferably 0.001 to 0.05 M. When the concentration of the salt is too high, the nanowire becomes thick in diameter, whereas when the concentration of the salt is too low, the reduction speed becomes slow, resulting in the decrease in productivity.

For the above polymer, for example, a marketed product having a weight-average molecular weight of 10,000 to 1,200,000 can be used. When the molecular weight is too low, the nanowire generation ability tends to be worse. When the molecular weight is too high, the solution viscosity becomes unfavorably high.

When the metal is silver, and the solvent is an aliphatic alcohol which is at least one selected from a group of ethylene glycol and propylene glycol, the concentration of at least one selected from the halides, sulfides, carbonates, and sulfates in the final solution is preferably $1\times10^{-8}$ M to $1\times10^{-2}$ M (M is mol/L), more preferably $2\times10^{-8}$ to $5\times10^{-3}$ M, and still more preferably $3\times10^{-8}$ to $3\times10^{-3}$ M, taking the ratio relative to the metal salt into account. When the concentration is too low, the effect of making the wire diameter smaller cannot be obtained, and when the concentration is too high, there is a drawback that the ratio of co-used metal to be reduced becomes unignorably high relative to the metal wire to be produced.

The molar mixing ratio of the metal salt, the polymer, (halide, sulfide, carbonate, and sulfate), and the aliphatic alcohol is, for example, $1:0.05$ to $15:1\times10^{-7}$ to $2\times10^{-2}:200$ to 9000, preferably $1:0.5$ to $10:1\times10^{-4}$ to $2\times10^{-2}:300$ to 8000, and more preferably $1:1$ to $10:2\times10^{-3}$ to $1\times10^{-2}:400$ to 7000.

According the production method of the present aspect, a solution containing the polymer and a solution containing the metal salt may be prepared separately, and the first solution may be prepared by mixing these solutions. In this case, a solvent of the solution containing the polymer and a solvent of the solution containing the metal salt, is at least one selected from a group of above aliphatic alcohols.

The metal nanowire produced by the production method of the present aspect has a diameter of 200 nm or less and a length of 10 μm or more. If the metal nanowire is too thin, the nanowire may not have a practical strength. Thus, the diameter of the metal nanowire is preferably 1 nm or more, and more preferably 5 nm or more.

In the production method of the present aspect, preferable metal salt is $AgNO_3$, from the viewpoint of solubility. In this case, the molar ratio between the metal salt and at least one selected from a group of halides, sulfides, carbonates, and sulfates satisfies preferably (metal salt):(at least one selected from a group of halides, sulfides, carbonates, and sulfates)=$1:1\times10^{-4}$ to $2\times10^{-2}$, and more preferably $1:2\times10^{-3}$ to $1\times10^{-2}$. When the concentration satisfies the above, silver nanowires can be produced at a favorable yield.

In the production method of the present aspect, preferably, the metal salt is $AgNO_3$, and the halide is a chloride such as NaCl, $CoCl_2$, $SnCl_4$, $CuCl_2$, $NiCl_2$, $FeCl_3$, $ZnCl_2$, and a quaternary ammonium salt represented by $R_4NCl$ (wherein, R is an alkyl group having 1 to 12 carbons). When other halides (bromide, iodide), or sulfides, carbonates, or sulfates are used, the solubility of a silver salt (silver bromide, silver iodide, silver sulfide, silver carbonate, silver sulfate) formed by the salt exchange with silver nitrate becomes low, resulting in the decrease in reactivity, and the decrease in yield.

According to the present aspect, production of the metal nanowires is preferably performed under a low shear stress. When a high shear stress is applied, the generated nanowire may be easily broken, and irregular-shaped Ag particles originated from the broken wires or generated as by-product, may be mixed. If metal nanowires under such a state are used, a transparent conductive film may be provided with high haze and low transmittance. Thus, the nanowires should be separated from the irregular-shaped particles. However, a large number of times of centrifugal sedimentation separation, etc., should be repeated for such separation, and thus, purification is not easy.

Accordingly, the practical shear stress to be applied at the time of producing metal nanowires is preferably 10 mPa·m or less, more preferably 5 mPa·m or less, and still more preferably 2 mPa·m. Although the shear stress can be measured by viscosity×shear rate, as practical evaluation, a reaction liquid (solution) viscosity (mPa·s) at the production temperature was measured, and a product of the reaction liquid (solution) viscosity and the fastest reaction liquid (solution) flow rate (m/s), in place of the shear rate (1/s), was obtained as a practical shear stress, and the practical shear stress was used as an index for a shear stress. As a matter of course, the reaction liquid used therefor should be an almost Newtonian fluid. The reaction liquid can be verified as an almost Newtonian fluid by confirming, in advance, that the viscosity is not influenced by the shear rate. In order to confirm that the viscosity is not influenced by the shear rate, for example, viscosities of the reaction liquid are measured at the number of rotations of 6 rpm and 60 rpm. If the ratio between the viscosities is approximately 1, the reaction liquid can be determined as an almost Newtonian fluid.

At this time, in particular, when the reaction is performed at a temperature higher than the boiling point of the aliphatic alcohol, i.e., solvent, unless the reaction is performed under the pressurized state, the solution is boiled and an unexpected shear stress is applied, resulting in failing to obtain a desired long and thin wire.

Further, in case of industrial production, in order to promptly reach a predetermined reaction temperature under a low shear stress state, and to keep the low shear stress thereafter, the reaction is preferably performed by the device shown in FIG. 1.

In FIG. 1, for example, Liquid-A is the above-mentioned first solution (metal salt, polymer, and aliphatic alcohol), and Liquid-B is the above-mentioned second solution (at least one selected from halides, sulfides, carbonates, and sulfates, and aliphatic alcohol). There may be other combinations of solution components, but preferably, the metal salt should not coexist with the at least one selected from halides, sulfides, carbonates, and sulfates. When they coexist, reaction may start while the temperature is rising and before the temperature reaches the aimed temperature, and thus, the shapes of the nanowires may not be uniform.

Liquid-A and Liquid-B are previously prepared separately, and preheated to the reaction temperature by preheaters 10a and 10b. Thereafter, Liquid-A and Liquid-B are mixed by a microreactor or a tubular reactor, under a low shear stress, and aged in a reaction device 12 heated to the reaction temperature.

The reaction may be performed at a slow circulation rate, using a loop reactor.

Alternatively, the mixing of the first solution and the second solution, or the mixing of the metal salt, the polymer, at least one selected from halides, sulfides, carbonates, and sulfates, and the aliphatic alcohol (preparation of the reaction liquid) may be performed at a temperature at which the reaction cannot progress (for example, room temperature), and thereafter, the reaction liquid may be heated to the reaction temperature under the conditions satisfying the practical shear stress being preferably 10 mPa·m or less, more preferably 5 mPa·m or less, and still more preferably 2 mPa·m or less, and reacted for a predetermine period of time.

Further, one of the characteristics of the present aspect is observing the ultraviolet-visible absorption spectrum of the reaction liquid during the reaction. At the start of the reaction, almost no ultraviolet-visible absorption spectrum caused by nanowires can be observed. However, in case of Ag, as the reaction progresses, the ultraviolet-visible absorption spectrum of nanowires can be observed at 350 to 370 nm, and the absorption wave length of spectrum of nano particles can be observed around 420 nm. Also, a broad peak with a peak around 380 to 389 nm can be observed as a reaction mixture.

Accordingly, when the reaction is performed under a low shear stress, as the nanowires grow, calculation results of the absorption intensity ratio 420 nm/350 nm are at least 2 or less, and usually 1.5 or less, and the peak intensity of 380 nm becomes higher. However, as the reaction continues under the same state, the amount of particle-like impurities increases. In order to prevent the increase of the particle-like impurities, the reaction is stopped before the peak ratio of 420 nm and 350 nm exceeds 2, and preferably 1.5, and further, before the absorption intensity at 380 nm becomes half or less of the peak (having a maximal value). Thereby, long and thin metal nanowires can be produced. More preferably, the reaction should be stopped while the absorption at 350 nm forms a peak (having a maximal value) and before the absorption at 350 nm forms a shoulder-like shape (having no maximal value).

With respect to 380 nm, continuous observation is preferable because peak intensities vary depending on the concentration of the metal salt. However, in case of industrial production, as far as the concentration used for the production is determined, a peak intensity can be determined by tracking the ultraviolet-visible absorption spectrum change of the reaction liquid at a the predetermined concentration, in association with the time spent for the reaction, and by using the maximum value of the obtained absorption intensities as the peak intensity.

In the above explanation, Ag is used as an example. When other metals are used, compositions of the reaction liquid, such as a kind and a concentration of a metal salt used, are different from the above case using Ag. Thus, the wavelength to be noted should be different. However, the reaction time can be similarly controlled on the basis of the ultraviolet-visible absorption spectrum information of the reaction liquid in association with the progress of the reaction.

EXAMPLES

Hereinafter, specific examples of the present disclosure will be explained. The examples are described below for the purpose of easy understanding of the present disclosure, and the present disclosure is not limited to these examples.

Preparation of Reaction Liquid

Using the device outlined in FIG. 1, reaction liquids to be used for reaction were prepared as described below.

Preparation of Liquid-A: 1 g of polyvinylpyrrolidone (weight-average molecular weight: 1,100,000, manufactured by Nippon Shokubai, Co., Ltd.) and 1.25 g of silver nitrate (manufactured by Wako Pure Chemical Industries, Ltd.) were dissolved in 500 g of ethylene glycol.

Preparation of Liquid-B: 9.16 mg of ferric chloride (special grade, manufactured by Wako Pure Chemical Industries, Ltd.) was dissolved in 17 g of ethylene glycol (special grade, manufactured by Wako Pure Chemical Industries, Ltd.).

Liquid-A and Liquid-B prepared as above were mixed in a beaker using a magnetic stirrer at a room temperature. Viscosities of the mixture at 20° C., 40° C., and 60° C. were respectively measured, and a viscosity at a high temperature was estimated by plotting 1/T (T is an absolute temperature) and a logarithm of each viscosity. The measured values and the estimated values of the viscosity are shown in Table 1.

TABLE 1

| T° C. | 1/T K | ln (η) | η | Remarks |
|---|---|---|---|---|
| 20 | 0.00341 | 3.145 | 23.2 | Measured value |
| 40 | 0.00319 | 2.432 | 11.4 | Measured value |
| 60 | 0.00300 | 1.805 | 6.08 | Measured value |
| 150 | 0.00236 | −0.283 | 0.754 | Estimated value |
| 180 | 0.00221 | −0.794 | 0.452 | Estimated value |

The mixture of Liquid-A and Liquid-B was placed in a 1 L cylindrical separable flask having an inner diameter of 12 cm and provided with three-necked cover, a Dimroth condenser was attached thereto, and the mixture was heated in an oil bath set at a predetermined temperature, while being stirred by a three-one motor.

Practical shear stresses [mPa·m] (linear velocity of outer periphery [m/s]×viscosity η [mPa·s]) were calculated on the basis of the inner diameter 12 cm, the numbers of rotations of the three-one motor, and the above-mentioned viscosities. The calculated practical shear stresses at respective numbers of rotations, at 150° C., are shown in Table 2.

TABLE 2

| Number of Rotations (rpm) | Linear Velocity (m/s) | Practical Shear Stress (mPa · s) |
|---|---|---|
| 10 | 0.226 | 0.17 |
| 100 | 2.26 | 1.7 |
| 300 | 6.79 | 5.1 |
| 600 | 13.6 | 10.2 |

FIG. 2 shows the ultraviolet-visible absorption spectra of the reaction liquids reacted at 150° C. for one hour, at different practical shear stresses. Table 3 shows the absorption intensity ratios of 420 nm and 350 nm (A420 nm/A350 nm) obtained from these ultraviolet-visible absorption spectra.

TABLE 3

| Practical Shear Stress (mPa · s) | 420/350 (A420 nm/A350 nm) |
|---|---|
| 0.17 | 1.1 |
| 1.7 | 1.1 |
| 5.1 | 1.1 |
| 10.2 | 4.6 |

FIGS. 3(a), 3(b), 3(c), and 3(d) show scanning electron microscope (SEM) images of Ag nanowires generated under respective conditions. FIG. 3(a) shows the case that the practical shear stress is 0.17 mPa·m, FIG. 3(b) shows the case that the practical shear stress is 1.7 mPa·m, FIG. 3(c) shows the case that the practical shear stress is 5.1 mPa·m, and FIG. 3(d) shows the case that the practical shear stress is 10.2 mPa·m.

As shown in FIG. 3(d), many particle-like by-products are contained in the case where the practical shear stress is 10.2 mPa·m. The reason therefor is considered that the practical shear stress exceeds 10 mPa·m. Further, since the amount of the particle-like by-products increases, the absorption intensity ratio of 420 nm and 350 nm obtained from the ultraviolet-visible absorption spectra has increased to 4.6.

FIG. 4 shows chronological change of the ultraviolet-visible absorption spectrum of the reaction liquid at the temperature of 150° C. and under the practical shear stress of 1.7 mPa·m. Table 4 shows the relationship between the absorption intensity at 380 nm and the absorption intensity ratio of 420 nm/350 nm at each reaction time, obtained from the ultraviolet-visible absorption spectrum.

TABLE 4

| | | 380 nm | |
|---|---|---|---|
| Reaction Time | 420/350 | Absolute Value | Relative Value Compared to Value of After 1 hr |
| 0 hr | 1.4 | 0.13 | |
| 0.5 hr | 1.1 | 1.28 | |
| 1 hr | 1.1 | 1.66 | 1.00 |
| 1.5 hr | 1.2 | 1.35 | 0.81 |
| 2 hr | 1.2 | 0.76 | 0.46 |
| 3 hr | 1.1 | 0.70 | 0.42 |

FIG. 5(a) and FIG. 5(b) show scanning electron microscope (SEM) images of Ag nanowires generated after the reaction time of 1.5 hours and 3 hours. FIG. 5(a) shows the one after the reaction time of 1.5 hours, and FIG. 5(b) shows the one after the reaction time of 3 hours. As can be seen from the drawings, particle-like by-products are observed after 3 hours. The reason therefor is considered that the reaction was continued until the absorption intensity of 380 nm obtained from the ultraviolet-visible absorption spectrum became half or less (0.42) of the peak absorption intensity (absorption intensity after the reaction time of 1 hour).

EXPLANATION OF NUMERALS 10a, 10b preheater, 12 reaction device

The invention claimed is:

1. A metal nanowire production method comprising, a step for preparing a solution containing a metal salt, a polymer, at least one selected from a group consisting of halides, sulfides, carbonates, and sulfates, and an aliphatic alcohol, and a step for heating and reacting the solution at the temperature of 100° C. to 250° C. for 10 minutes or more while maintaining a simplified shear stress applied to the solution at 10 mPa·m or less, wherein, during the heating and reacting step, ultraviolet-visible absorption spectrum change of the solution is measured, and a reaction time is controlled on the basis of the ultraviolet-visible absorption spectrum information.

2. A metal nanowire production method according to claim 1, wherein the metal is at least one selected from a group consisting of gold, silver, copper, platinum, palladium, ruthenium, cobalt, nickel, molybdenum, indium, iridium, and titanium.

3. A metal nanowire production method according to claim 1, wherein the metal salt is at least one selected from a group consisting of a nitrate, an organic carboxylate, a metal alkoxide, and a metal phenoxide.

4. A metal nanowire production method according to claim 1, wherein the polymer is at least one selected from a group consisting of polyvinylpyrrolidone, poly-N-vinyl acetamide, poly-N-vinyl formamide, polyvinyl caprolactam, and polyacrylamide.

5. A metal nanowire production method according to claim 1, wherein the aliphatic alcohol has a boiling point of 100° C. or more at 1 atmospheric pressure, and a viscosity of 10 Pa·s or less at 25° C.

6. A metal nanowire production method according to claim 1, wherein the halide is selected from a group consisting of NaCl, $CoCl_2$, $SnCl_4$, $CuCl_2$, $NiCl_2$, $FeCl_3$, $ZnCl_2$, NaBr, NaI, KBr, KI, and quaternary ammonium salts represented by $R_4NCl$, $R_4NBr$, $R_4NI$ (wherein, R is an alkyl group having 1 to 12 carbons), the sulfide is selected from a group consisting of $Na_2S$ and $K_2S$, the carbonate is selected from a group consisting of $Na_2CO_3$ and $K_2CO_3$, and the sulfate is selected from a group consisting of $Na_2SO_4$ and $K_2SO_4$.

7. A metal nanowire production method according to claims 1, wherein metal is silver, the aliphatic alcohol is at least one selected from a group consisting of ethylene glycol and propylene glycol, and the at least one selected from a group consisting of halides, sulfides, carbonates, and sulfates has a concentration of $1\times10^{-8}$ M to $1\times10^{-2}$ M.

8. A metal nanowire production method according to claim 7, wherein, ultraviolet-visible absorption spectrum of the solution is measured during the heating step, and the reaction is stopped at a point where a ratio (A420 nm/A350 nm) representing an absorption intensity at 350 nm (A350) relative to an absorption intensity at 420 nm (A420) is 2 or less, and an absorption intensity at 380 nm (A380) is more than a half of the peak absorption intensity at 380 nm.

9. A silver nanowire production method comprising, a step for preparing a solution containing a silver salt, a polymer, at least one selected from a group consisting of halides, sulfides, carbonates, and sulfates, and an aliphatic alcohol, and a step for heating and reacting the solution at the temperature of 100° C. to 250° C. for 10 minutes or more while maintaining a simplified shear stress applied to the solution at 10 mPa·m or less, wherein, during the heating and reacting step, ultraviolet-visible absorption spectrum change of the solution is measured, and a reaction time is controlled on the basis of the ultraviolet-visible absorption spectrum information.

10. A silver nanowire production method according to claim 9, wherein the silver salt is at least one selected from a group consisting of a nitrate, an organic carboxylate, a silver alkoxide, and a silver phenoxide.

11. A silver nanowire production method according to claim 9, wherein the polymer is at least one selected from a group consisting of polyvinylpyrrolidone, poly-N-vinyl acetamide, poly-N-vinyl formamide, polyvinyl caprolactam, and polyacrylamide.

12. A silver nanowire production method according to claim 9, wherein the aliphatic alcohol has a boiling point 100° C. or more at 1 atmospheric pressure, and a viscosity of 10 Pa·s or less at 25° C.

13. A silver nanowire production method according to claim 9, wherein the halide is selected from a group consisting of NaCl, $CoCl_2$, $SnCl_4$, $CuCl_2$, $NiCl_2$, $FeCl_3$, $ZnCl_2$, NaBr, NaI, KBr, KI, and quaternary ammonium salts represented by $R_4NCl$, $R_4NBr$, $R_4NI$ (wherein, R is an alkyl group having 1 to 12 carbons), the sulfide is selected from a group consisting of $Na_2S$ and $K_2S$, the carbonate is selected from a group consisting of $Na_2CO_3$ and $K_2CO_3$, and the sulfate is selected from a group consisting of $Na_2SO_4$ and $K_2SO_4$.

14. A silver nanowire production method according to claim 9, wherein the aliphatic alcohol is at least one selected from a group consisting of ethylene glycol and propylene glycol, and the at least one selected from a group consisting of halides, sulfides, carbonates, and sulfates has a concentration of $1\times10^{-8}$ M to $1\times10^{-2}$ M.

15. A silver nanowire production method according to claim 14, wherein, ultraviolet-visible absorption spectrum of the solution is measured during the heating step, and the reaction is stopped at a point where a ratio (A420 nm/A350 nm) representing an absorption intensity at 350 nm (A350) relative to an absorption intensity at 420 nm (A420) is 2 or less, and an absorption intensity at 380 nm (A380) is more than a half of the peak absorption intensity at 380 nm.

* * * * *

UNITED STATES PATENT AND TRADEMARK OFFICE
CERTIFICATE OF CORRECTION

PATENT NO. : 10,099,291 B2
APPLICATION NO. : 14/893329
DATED : October 16, 2018
INVENTOR(S) : Katsuaki Suganuma et al.

Page 1 of 1

It is certified that error appears in the above-identified patent and that said Letters Patent is hereby corrected as shown below:

In the Claims

In Claim 1, at Column 9, Line 44:
Delete "simplified shear" and insert --practical shear--;

In Claim 9, at Column 10, Line 31:
Delete "simplified shear" and insert --practical shear--.

Signed and Sealed this
Twelfth Day of February, 2019

Andrei Iancu
*Director of the United States Patent and Trademark Office*